(12) United States Patent
McMillan

(10) Patent No.: US 7,426,875 B1
(45) Date of Patent: Sep. 23, 2008

(54) LOW FLOW RATE MEASUREMENT AND CONTROL

(75) Inventor: Robert M. McMillan, Georgetown, TX (US)

(73) Assignee: McMillan Company, Georgetown, TX (US)

( * ) Notice: Subject to any disclaimer, the term of this patent is extended or adjusted under 35 U.S.C. 154(b) by 0 days.

(21) Appl. No.: 11/901,088

(22) Filed: Sep. 14, 2007

(51) Int. Cl.
*G01F 1/05* (2006.01)
(52) U.S. Cl. .................................................. 73/861.79
(58) Field of Classification Search ............. 73/861.79, 73/861.77, 861.71, 861.83, 861.75
See application file for complete search history.

(56) References Cited

U.S. PATENT DOCUMENTS

| 5,303,597 | A | * | 4/1994 | Noren | ................. 73/32 R |
| 5,542,302 | A | | 8/1996 | McMillan | |
| 5,636,178 | A | * | 6/1997 | Ritter | ................. 367/83 |
| 5,728,949 | A | | 3/1998 | McMillan | |
| 6,065,352 | A | * | 5/2000 | Schieber | ................. 73/861.79 |
| 7,051,757 | B2 | | 5/2006 | McMillan | |

* cited by examiner

*Primary Examiner*—Jewel V Thompson
(74) *Attorney, Agent, or Firm*—Bracewell & Giuliani LLP

(57) ABSTRACT

A turbine wheel flow measuring transducer located in a fluid receiving chamber is provided for measuring low flow rates of fluids, whether liquids, gases, or mixtures, and in controlling the fluid flow rates. The transducer is in the form of a small diameter turbine wheel having a plurality of semi-circular lateral openings in its outer periphery. The openings are sequentially presented to the incoming fluid into the chamber and the turbine wheel rotates according to the fluid flow rate. Measuring and controlling of fluid flow rates as low as 4-5 milliliters per minute and as high as 100 milliliters per minute is permitted.

22 Claims, 11 Drawing Sheets

LOW FLOW RATE MEASUREMENT AND CONTROL

BACKGROUND OF THE INVENTION

1. Field of the Invention

The present invention relates to measuring and control of fluid flow, particularly at low fluid flow rates. More particularly, the present invention permits such measurement and control of fluid flow with a flow sensor which is accurate at fluid flow rates as low as 4-5 milliliters per minute and as high as 100 milliliters per minute.

2. Description of the Related Art

Measurement of the flow or flow rate of a fluid in a conduit, particularly, at very low fluid flow rates, has been a problem if attempted using conventional flow sensors. At very low flow many fluid sensors do not operate properly. For example, velocity flow meters such as turbine wheel flow sensors cease to operate due to there being insufficient energy in the fluid to rotate the wheel. Differential pressure flow sensors can at times operate at low flows, but the smaller flow orifices required for low flows have been prone to obstruction if there were suspended particles in the fluid. Also, pressure drops across the orifices could be significant.

Other related specialized flow sensing techniques are disclosed in U.S. Pat. Nos. 5,542,302; 5,728,949; and 7,051,757 which disclose the use of infrared light from an optical flow measurement circuit that passes through spaced holes in the rotating turbine wheel.

Although these prior flow sensing techniques patents address some of the problems of measuring and controlling flow rate of a fluid in a conduit, so far as is known, these prior flow sensing techniques are not capable of satisfactorily measuring or controlling fluid flow rate at rates less than approximately 10 milliliters per minute.

SUMMARY OF THE INVENTION

Briefly, the present invention provides new and improved flow meter for a fluid flowing at a low flow rate. The flow meter according to the present invention includes a housing body which has a flow inlet receiving incoming fluid at the low flow rate and a flow outlet allowing the fluid to exit from the housing body. A flow receiving chamber is located in the housing body between the flow inlet and the flow outlet and receives the low flow rate fluid. A turbine wheel is mounted for rotational movement within the flow receiving chamber. The turbine wheel has a plurality of semi-circular openings formed at spaced positions about an outer peripheral portion, and the openings extend laterally through the turbine wheel.

The openings are successively positioned adjacent the flow inlet as the turbine wheel rotates in response to fluid passage into the flow receiving chamber. The openings define a volumetric space which receives a quantity of the incoming low flow rate fluid from the flow inlet. A monitoring mechanism monitors the rotation of the turbine wheel in response to the passage of the low flow rate fluid through the receiving chamber.

Low flow rate control according to the present invention is provided by a flow controller which includes a flow meter to obtain measurements or readings of the fluid flow rate and a flow control valve located in the flow path of the low flow rate fluid. The flow meter includes a housing body which has a flow inlet receiving incoming fluid at the low flow rate and a flow outlet allowing the fluid to exit from the housing body. A flow receiving chamber is located in the housing body between the flow inlet and the flow outlet and receives the low flow rate fluid. A turbine wheel is mounted for rotational movement within the flow receiving chamber. The turbine wheel has a plurality of semi-circular openings formed at spaced positions about an outer peripheral portion, and the openings extend laterally through the turbine wheel.

The openings are successively positioned adjacent the flow inlet as the turbine wheel rotates in response to fluid passage into the flow receiving chamber. The openings define a volumetric space which receives a quantity of the incoming low flow rate fluid from the flow inlet. A monitoring mechanism monitors the rotation of the turbine wheel in response to the passage of the low flow rate fluid through the receiving chamber.

The flow control valve of the flow controller according to the present invention is With the present invention, measure and control of flow rates of a fluid at fluid flow rates less than 10 milliliters per minute (mL/min), and in particular, at fluid flow rates as low as 5-6 mL/min, are obtained with repeatable accuracy and consistency.

DETAILED DESCRIPTION OF THE PREFERRED EMBODIMENTS

Figure 1:
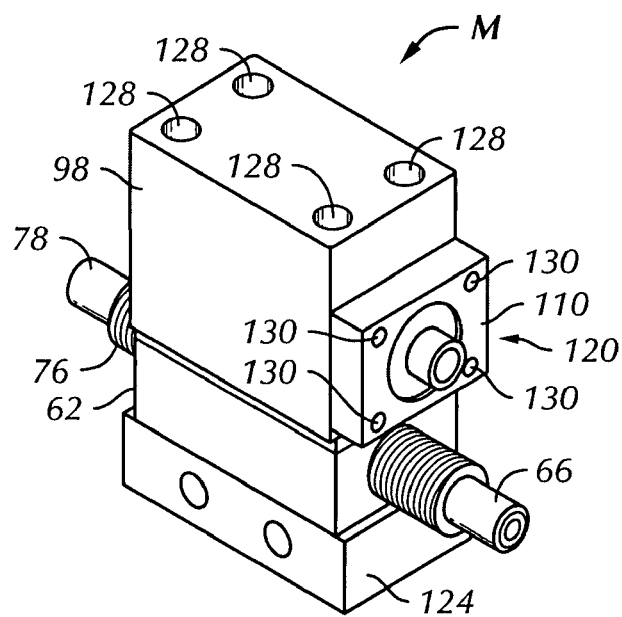
FIG. 1 is an isometric view of a flow meter according to the present invention.
Figure 2:
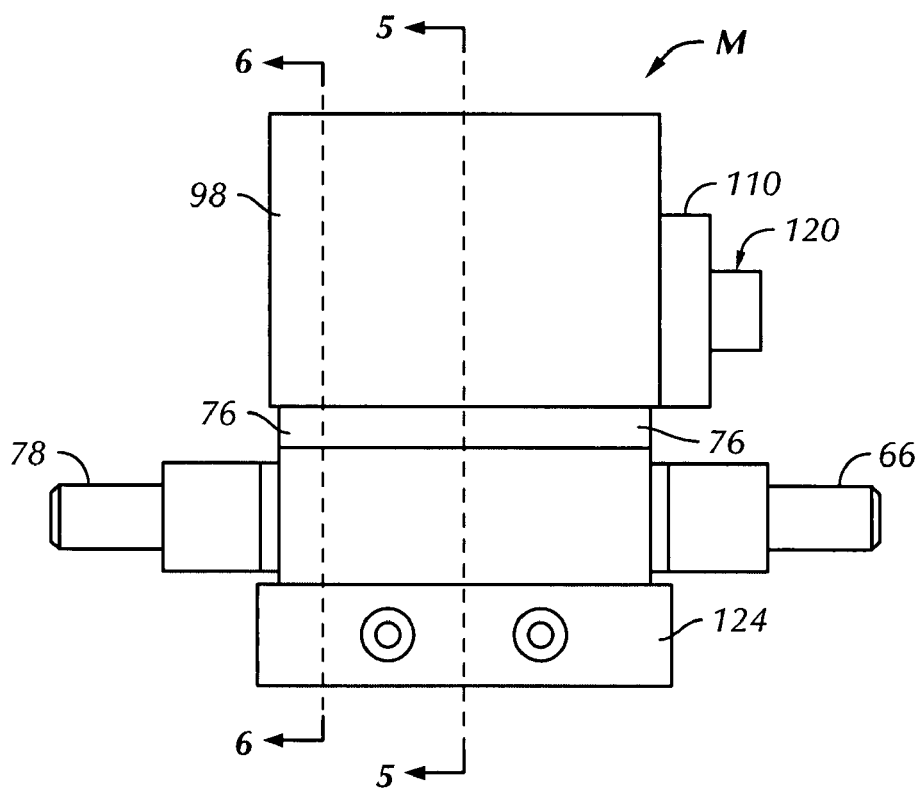
FIG. 2 is a side elevation view of the flow meter of FIG. 1.
Figure 3:
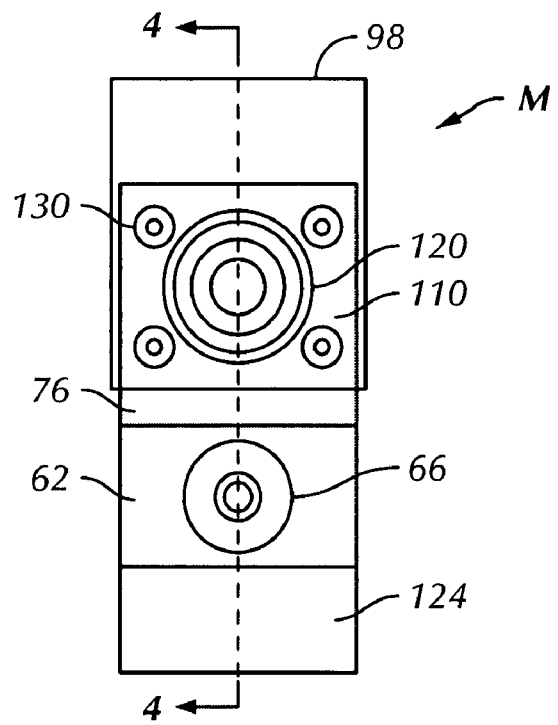
FIG. 3 is a front elevation view of the flow meter of FIG. 1.
Figure 4:
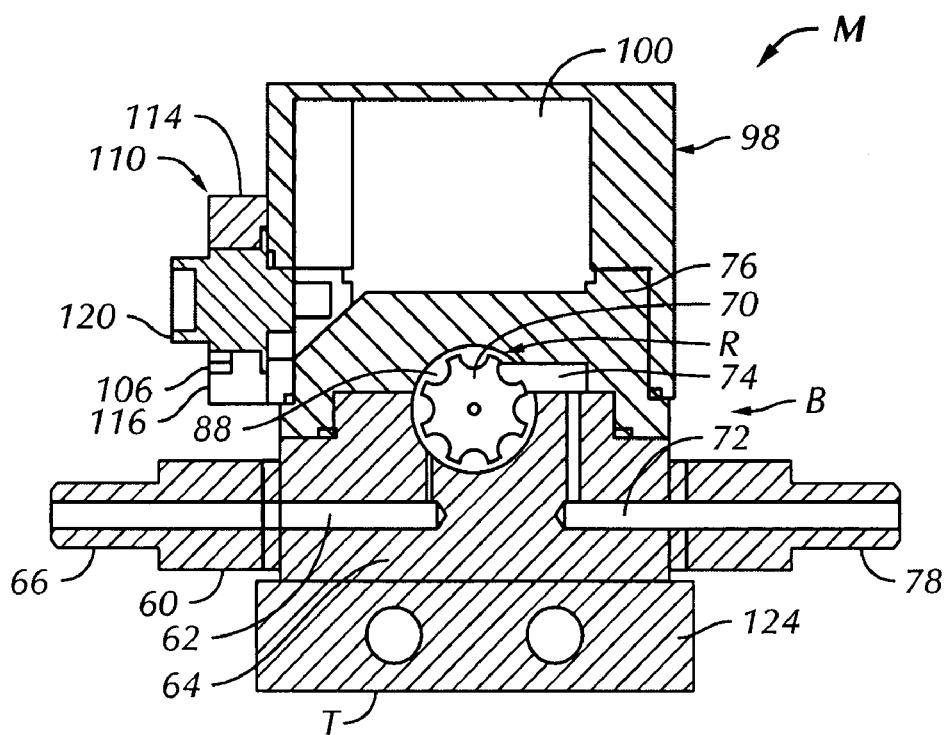
FIG. 4 is a cross-sectional view taken along the lines 4-4 of FIG. 3.
Figure 5:
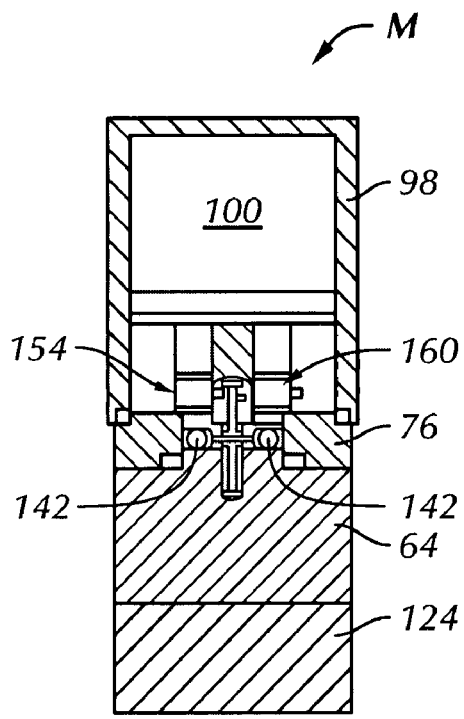
FIG. 5 is a cross-sectional view taken along the lines 5-5 of FIG. 2.

In the drawings (FIGS. 1-6), a flow meter M for a fluid flowing at a low flow rate is shown. As will be set forth, the flow meter M is adapted to measure flow rates of a fluid at fluid flow rates less than 10 milliliters per minute (mL/min), and in particular, at fluid flow rates as low as 5-6 mL/min, with repeatable accuracy and consistency. The present invention also provides a flow controller C (FIGS. 21-23) which includes the flow meter M and a flow control valve V operably connected to the flow meter M. Based on the established settings or desired performance of the flow controller C, the flow control position or setting of the flow control valve V is adjusted based on the flow rate measurements made in the flow meter M in order that the flow rate is controlled to conform to the desired flow rate.

Figure 7:
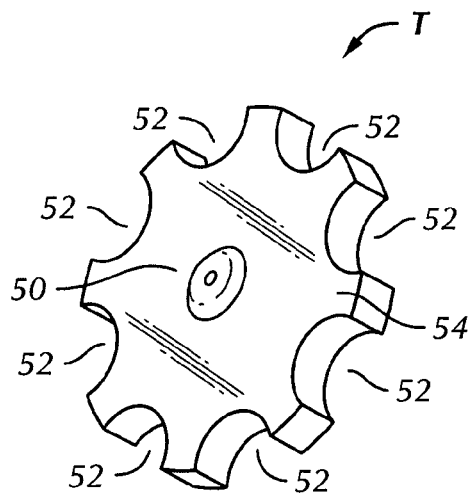
FIG. 7 is an isometric view of a turbine wheel flow measuring transducer of the flow meter according to the present invention.
Figure 8:
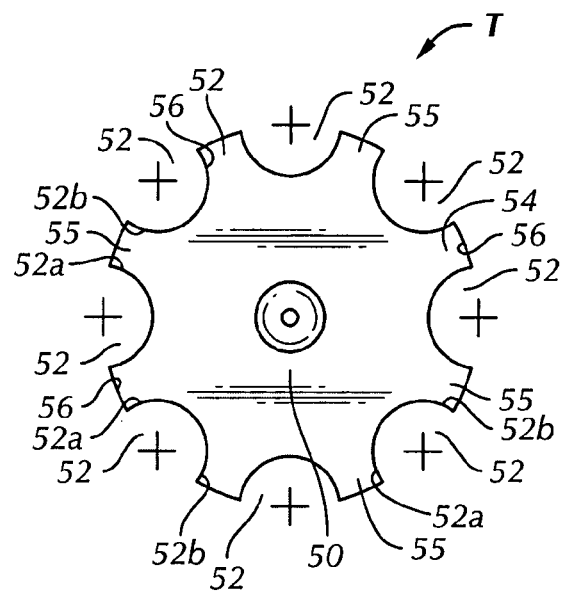
FIG. 8 is a front elevation view of the turbine wheel flow measuring transducer shown in FIG. 7.
Figure 9:
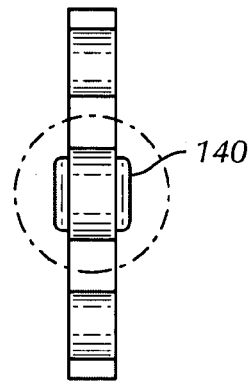
FIG. 9 is a side elevation view of the turbine wheel flow measuring transducer shown in FIG. 7.

The present invention also provides a turbine wheel flow measuring transducer T (FIGS. 7-9). The flow measuring transducer T is located in a fluid receiving chamber R (FIG. 4) which is provided in a housing body B for measuring low flow rates of fluids, whether liquids, gases, or mixtures, and in controlling the fluid flow rates. The transducer T is in the form of a small diameter turbine wheel or disk 50 (FIG. 7) having a plurality of semi-circular lateral openings 52 in its outer periphery 54. The openings 52 extending laterally through the turbine wheel 50 for allowing the passage of optical energy therethrough.

The openings 52 are sequentially presented to the incoming fluid into the chamber R and the turbine wheel 50 rotates according to the fluid flow rate. Measuring and controlling of fluid flow rates as low as 4-5 milliliters per minute (mL/min) and as high as 100 milliliters per minute is permitted. As an example, eight ounces of water moving at a flow rate of about 4 mL/min requires about one hour.

Figure 10:
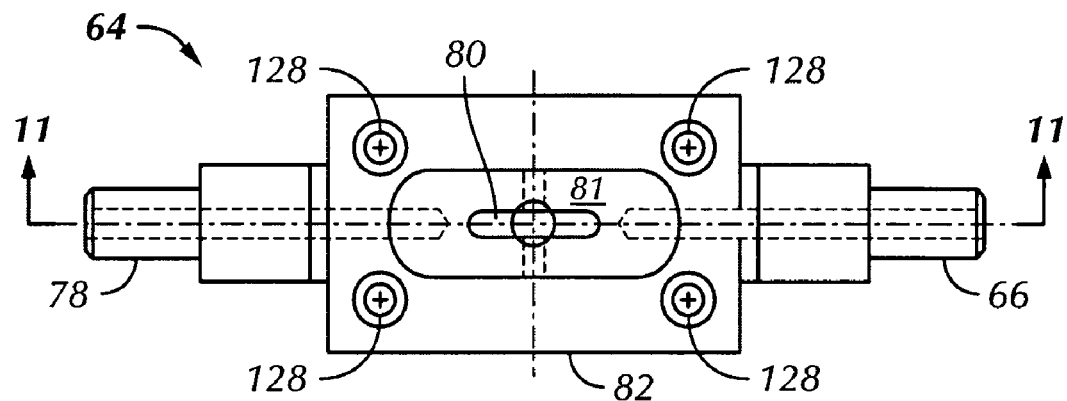
FIG. 10 is a plan view of a lower block of a housing body of the flow meter of FIGS. 1-6.
Figure 11:
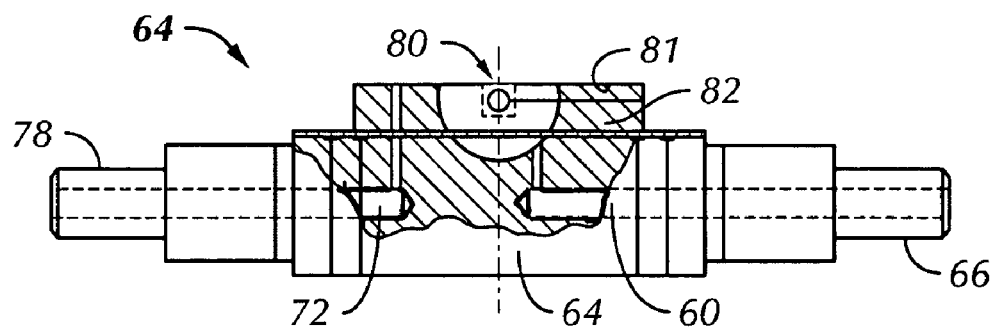
FIG. 11 is a side elevation view, taken partly in cross-section, of the lower block of FIG. 10.

Considering the flow meter M more in detail (FIGS. 1-6), the housing body B has a flow inlet 60 formed to allow the fluid receiving chamber R to receive incoming fluid. The incoming fluid travels through a flow passage 62 formed in a lower block 64 (FIGS. 10-11) of the housing body B. The flow passage is in fluid communication with an inlet connector port 66 which is adapted to be connected to a suitable fluid transport tube or pipe through which the fluid moves to the flow meter M. As the fluid enters the chamber R, the openings 52 in the turbine wheel T are successively positioned adjacent the flow inlet 60, and the turbine wheel T rotates. As will be set forth, the openings 52 are formed in the wheel T so that the longitudinal axis of the incoming flow is perpendicular to side walls of such openings. The successively presented openings 52 each define a volumetric space receiving a quantity of the incoming low flow rate fluid.

The flow meter M also includes a flow outlet 70 formed in the housing body B on an opposite side of the flow receiving chamber R to allow the fluid to exit from the housing body. A flow passage 72 formed in the lower block 64 of housing body B is in fluid communication with an exit portal chamber 74 formed in an upper block 76 of the housing body B. The exit chamber 74 receives fluid exiting from the chamber R, and the fluid then moves through passage 72 to an outlet connector port 78 which is adapted to be connected to a suitable fluid transport tube or pipe for movement of the fluid from the meter M.

Figure 13:
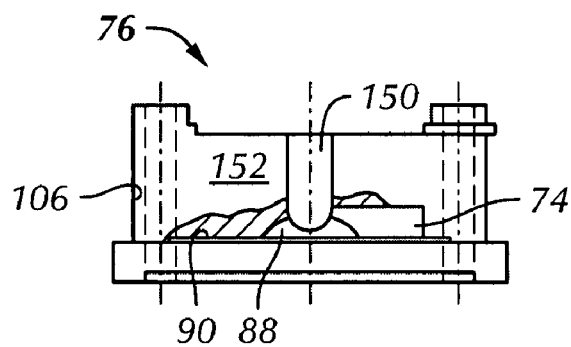
FIG. 13 is a side elevation view, taken partly in cross-section, of the upper block of FIG. 12.

The flow receiving chamber R includes a lower circular chamber portion 80 (FIGS. 10 & 11) formed extending downwardly into an upper surface 81 of a shoulder 82 formed on the central upper portions of the lower block 64. The flow receiving chamber R also includes an upper circular chamber portion 88 (FIG. 13) formed extending upwardly into a lower surface 90 of a socket 92 formed in a lower surface 94 of the upper block 76. The exit portal chamber 74 is formed in the upper block 76 extending away from the upper chamber portion 88 to allow fluid movement from the chamber R to passage 72 and outlet connector port 78 for exit from the meter M.

The housing body B includes a cover member 98 which is mounted above the upper block 76 and defines an interior chamber 100 which is adapted to receive instrumentation and electrical connectors of the flow meter M. A port or passage channel 102 is formed in a side portion 106 of the upper body block 76 to allow passage of connector conductors into the interior chamber 100. An instrumentation port panel 110 (FIGS. 1-4) with a central port 112 is mounted on the housing body B, with upper portion 114 of the panel 110 being mounted to the cover member 98 and lower portion 116 mounted to the upper body block 76. A connector port 120 is mounted with the port panel 110 to allow electrical connection with the instrumentation and electrical connectors in the interior chamber 100.

A side mounting bottom plate 124 is mounted beneath the lower block 64 of the body block B. The plate 124 has sockets or ports formed therein for receipt of suitable screws or other connectors. The plate 124 allows the body block B and thus the meter M to be mounted so that the turbine wheel T is positioned for rotation in the vertical plane (as shown) or in the horizontal plane.

Figure 6:
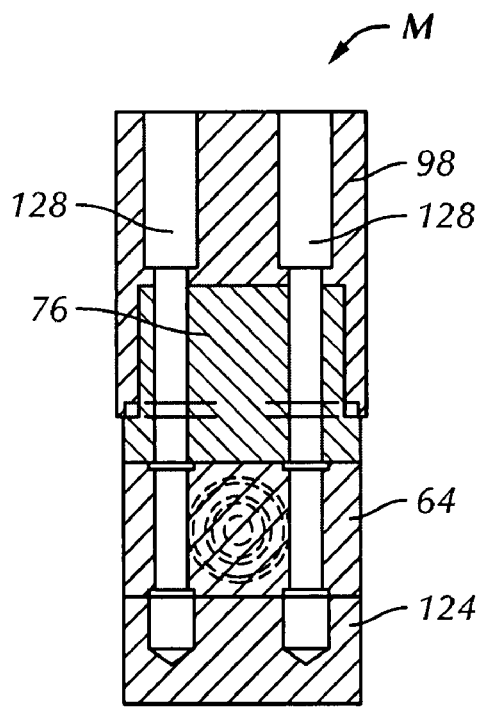
FIG. 6 is a cross-sectional view taken along the lines 6-6 of FIG. 2.

The cover member 98, upper body block 76, lower body block 64 and bottom plate 124 as structural components of the housing body B are interconnected and integrated into a sealed unitary body by suitable connector screws, bolts or other connectors which are inserted into vertically threaded sockets 128 (FIG. 6). Similarly, the instrumentation port panel 110 is mounted to the cover member 98 and upper body block 76 by suitable connector screws, bolts or the like which are inserted into sockets 130 (FIG. 1).

Fluid sealing is provided, in a like manner to the commonly owned U.S. Patents mentioned above, between the structural components of the housing body B by the formation of suitably located grooves or channels formed on adjacent contact surfaces of such components. Suitable conventional sealing members, such as for example, an O-ring or a gasket of an elastomer or the like, are positioned in the grooves of the structural components of the housing body B during its assembly. Thus, when the connectors are inserted and tightened during assembly of the housing body B, a positive fluid seal is provided between the structural components of the housing body.

The housing body B is preferably fabricated from polytetrafluoroethylene, or PTFE, and preferably a PTFE. PTFE has a tendency to cold-flow under tension. Thus, the connector members for the structural components of the housing body B may, if desired, take the form of machine screws which expand or contract due to temperature changes to prevent damage. For example, preloaded machine screws using Belleville washers may be used. It should be understood that other materials may be used, if desired. Example materials such as a perfluoroalkoxyl copolymer resin, also referred to as PFA, or some other suitable polymer resin having comparable optical properties may be used, based on cost or other design considerations.

With the present invention, the turbine wheel T (FIGS. 7-9) is formed having a suitable number of teeth or openings 52 located at equally radially spaced locations. A suitable number of turbine wheel openings 52 may be, for example, eight, so that each of the blades is radially spaced from the next adjacent blade by an angle of 45°. It should be understood, however, that fewer or more openings 52 may be used in appropriate situations on the turbine wheel T.

Each of the openings 52 of the turbine wheel T has an arcuate, semi-circular leading surface 52a (FIG. 8) and a similarly configured arcuate, semi-circular surface 52b formed on the outer peripheral portion 54. The surfaces 52a and 52b preferably form a continuous circular surface, defining a circular opening. Preferably, the surface 52a is formed and located so that portions thereof are perpendicular to the longitudinal axis of the incoming flow from inlet 60. In this manner, the force of the flow is tangential to the rotational axis of the turbine wheel T.

The openings 52 are formed by removing a circular portion of disk material at the outer or peripheral portion 54 of the turbine wheel disk 50 leaving the circular aperture or port 52 in its place. As a result, the turbine wheel T has a number of circular openings 52 formed therein in the region, with a blade region 55 of disk 50 remaining between the leading surface 52a and the trailing surface 52b of adjacent openings 52.

As illustrated in FIGS. 7-9, disk 50 of turbine wheel T is designed with a plurality blades 55 formed by the plurality of semi-circular shaped openings 52 so that blades 55 have arcuate circular sides 52a and 52b. Each blade 55 also includes arcuate outer surface 56 defined by the outer circumferential surface on the outer diameter of disk 50 of turbine wheel T. In the drawings, the sides 52a and 52b of openings 52 are each formed by a 90° arc traveling inwardly over a portion of disk 50 from its outer periphery or circumferential surface toward the center of turbine wheel T and back to the outer circumference of turbine wheel T. This results in the opening 52 defining an approximate semi-circle or an arc of about 180°. If desired, more or less than a 180° arc may be formed. For example, an arc from about 150° to about 210° may be formed to define the size of the semi-circular shaped openings 52.

The size of turbine wheel T, including each of the plurality of semi-circular shaped grooves 52, can be any size desired or necessary depending on the type and viscosity of the fluid to be accurately measure and controlled. For fluid flow rates as low as 4-5 mL/min, in a preferred embodiment, turbine wheel T has a width of about 0.06 inches, a diameter of 0.5 inches, and each of the plurality of semi-circular shaped grooves 52 have a radius R of 0.12 inches. Thus, the semi-circular grooves 52 have a diameter of about one-fourth the diameter of the turbine wheel T. Further, the axis upon which turbine wheel T rotates preferably has a width of 0.1 inches, and the shaft through rotational axis of the turbine wheel T is 0.020 inches. The embodiments shown in the drawings of the present application are thus enlarged in order that the structure may be more clearly seen.

The structure of the blades 55 and semi-circular shaped openings 52 reduce the tendency of gas bubbles attaching to the turbine wheel T, either the side walls of the blades 55 or surfaces 52a adjacent the semi-circular shaped openings 52. Moreover, gas bubbles are more readily expelled from turbine wheel T by blades 55 and semi-circular shaped openings 52.

In accordance with the present invention, the turbine wheel T with the circular ports or apertures 52 in the periphery of the turbine wheel T at its outer circumferential portion 54 between adjacent openings 52, a number of advantages have been found to result. The present invention reduces the effects of bubbles in the liquid, which might otherwise impede low flow rotation and measurement.

The present invention also allows optical detection techniques to be used for low fluid flow rates with reduced turbine wheel size and mass for more accurate readings. The present invention further reduces viscous adhesive effects and surface tension friction which might also impede accuracy in low flow rotation and measurement.

The present invention also more effectively responds to the force of the incoming liquid, and in particular at low liquid flow rates. It should be understood that turbine wheel T can be utilized with a flow controlling or measuring device of other types, and in particular where low flow rates, such those as low as 4-5 mL/min are desired or required.

Figure 9A:
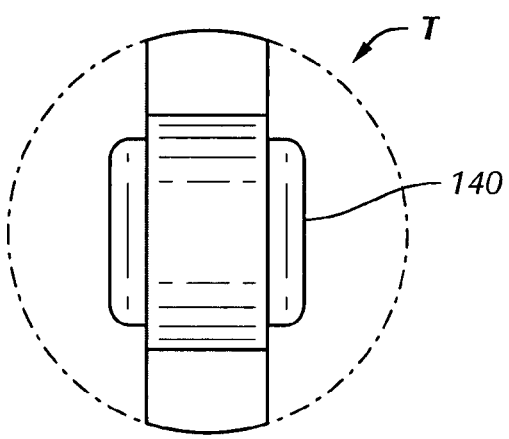
FIG. 9A is an enlarged view of a portion of the structure of FIG. 9 encircled and having reference numeral 9A designating same.

The turbine wheel T rotates around an axial bearing 140 (FIGS. 9 & 9A) that cooperates with a suitable rotatable bearing support 142 (FIG. 5) of the conventional type for supporting the bearing so that turbine wheel T is mounted in position within fluid receiving chamber R. In such a mounting position, the turbine wheel T is freely rotatable in the fluid receiving chamber R to respond to forces of the fluid flow in the meter M for flow measurement or control according to the present invention. In this way, turbine wheel T is preferably mounted in the chamber R for free rotational movement in response to fluid flow. This is accomplished with a low friction bearing 140, such as a sapphire shaft and bearing. In order to allow measurement of very low flow rates, the bearing support 142 is preferably a very low friction bearing support.

Figure 12:
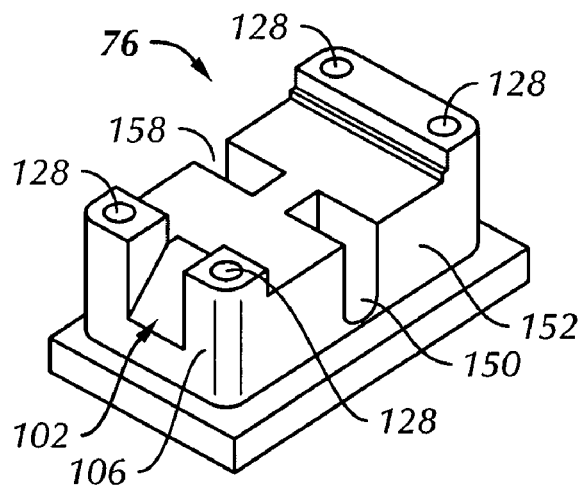
FIG. 12 is an isometric view of an upper block of a housing body of the flow meter of FIGS. 1-6.
Figure 14:
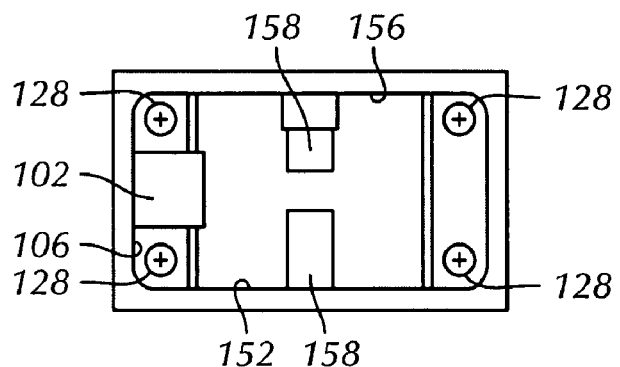
FIG. 14 is a bottom view of the upper block of FIG. 12.

A mounting slot or channel 150 (FIGS. 12-14) is formed in a recessed side wall 152 of the upper block 76. The slot 150 is adapted for receiving an energy signal producing source 154 (FIG. 5) which transmits detectable energy, typically optical radiation, through side wall 152 of the upper block 76 into the fluid receiving chamber R containing the turbine wheel T. Further, a recessed side wall 156 of the upper block 76 adjacent chamber R also equipped is formed with a similarly formed mounting socket or bore 158 for receiving a signal sensor 160. The sensor 160 detects signal energy or radiation levels passing through the walls of the upper block 76 and through the chamber R. The recessed side walls 152 and 156 provide space for connection of the source 154 and sensor 160 to instrumentation electronics or connectors in the interior chamber 100 of the cover member 98.

The source 154 and sensor 160 are aligned with each other in their respective slots or channels so that signal energy emitted from signal source 154 travels through side wall 152 and through the chamber R in an area where the turbine wheel T is rotatably mounted, and thence through the side wall 156 to the radiation detector 160. Since the housing is preferably fabricated from PTFE, the energy source 154 and the detector 160 are preferably an infrared light emitting diode and a phototransistor receiver, respectively. For dark or colored liquids, diodes which emit other wavelengths of radiation may be desirable.

As the turbine wheel T rotates, the energy from source 154 passing through for detection by sensor or detector 160 is governed by the relative presence of the openings 52 and the blades 55 of the rotating turbine wheel T. When one of the openings 52 is present, energy from signal source 154 passes through chamber R to be received by detector 160. Conversely, when the openings 50 are not present, the presence of the blades 55 of the wheel 50 blocks detector 160 from sensing energy emitted from source 154. Thus, the speed of rotation of turbine wheel T can be determined by the frequency per unit of time in which a pulse of radiation signal emitted from 154 is received by detector 160. Thus, optical counting of the rotation of the turbine wheel occurs in a manner disclosed in U.S. Pat. Nos. 5,542,302 and 5,728,949, which are incorporated herein by reference.

It should be understood that any suitable material may be used for the housing body B and turbine wheel T, based on the type and viscosity of the fluid flowing through flow meter M or controller C. When it is desired to accurately measure and control fluid flow rates as low as 4-5 mL/min, as in a preferred embodiment, turbine wheel T is formed 10% graphite filled PTFE. Additionally, in this specific embodiment, if desired the body of disk 50 may be made to possess increased opacity to light by darkening agents to provide additional optical contrast with the areas left open by the openings 52.

By reducing the size or diameter of turbine wheel T, and by forming turbine wheel T out of light weight materials such as 10% graphite filled PTFE, turbine wheel T is more sensitive and thus accurate for measuring flow rates. Advantages are achieved from prior art. The PTFE material is also persistent to most chemicals. In the embodiment discussed herein where turbine wheel T has a diameter of 0.5 inches and is formed out of 10% graphite filled PTFE, turbine wheel T has a weight of approximately 0.25 grams. Prior turbine wheels have weights of approximately 1 gram and diameters of approximately 0.9 inches. The low mass of turbine wheel T facilitates rotation of turbine wheel T with lower fluid flow rates. Additionally, surface tension of turbine wheel T is reduced as turbine wheel T rotates within the fluid. This reduction in surface tension permits measurement of very low flow rates, e.g., 4-5 mL/min of higher viscosity fluids.

Additionally, turbine wheel T is preferably designed to more closely fit within the flow path of the fluid flowing through chamber R. This more closely fit turbine wheel T allows for more rotational efficiency with low flow rates, e.g., as low as 4-5 mL/min. Manufacturing of turbine wheel T to more closely fit within the flow path is achievable due to the smaller size of turbine wheel T.

While the housing body B may expand and contract due to temperature variations of fluid being measured, a sufficient gap is allowed between the turbine wheel T and shaft 140 and bearing supports 142 to allow for dimensional changes caused by temperature variations. Thus, turbine wheel T is able to rotate freely at all times on sapphire shaft 140 held in place in bearing supports 142.

Figure 21:
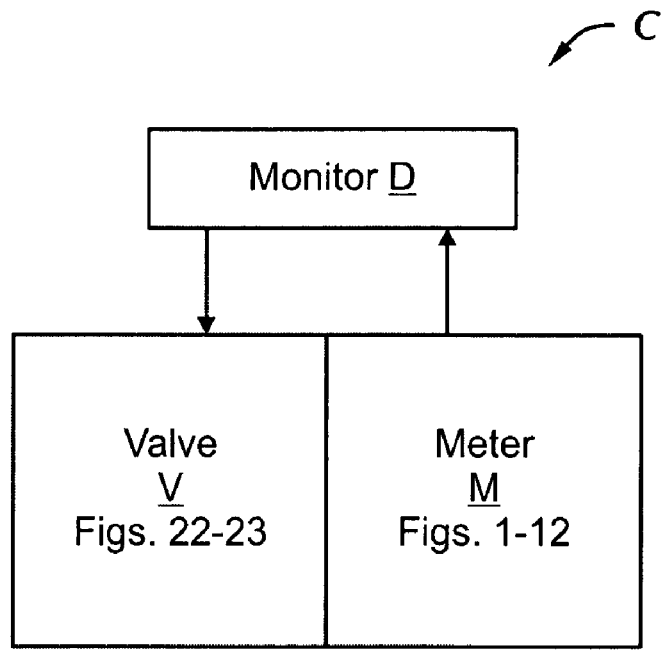
FIG. 21 is a functional block diagram of a flow controller according to the present invention.
Figure 23:
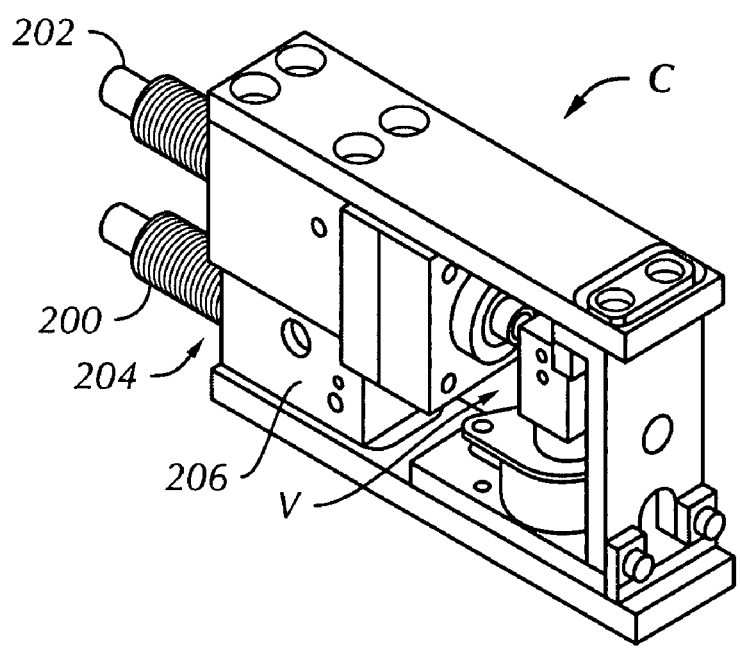
FIG. 23 is an isometric view, with portions thereof removed, of portions of the flow controller shown in FIG. 22.
Figure 22:
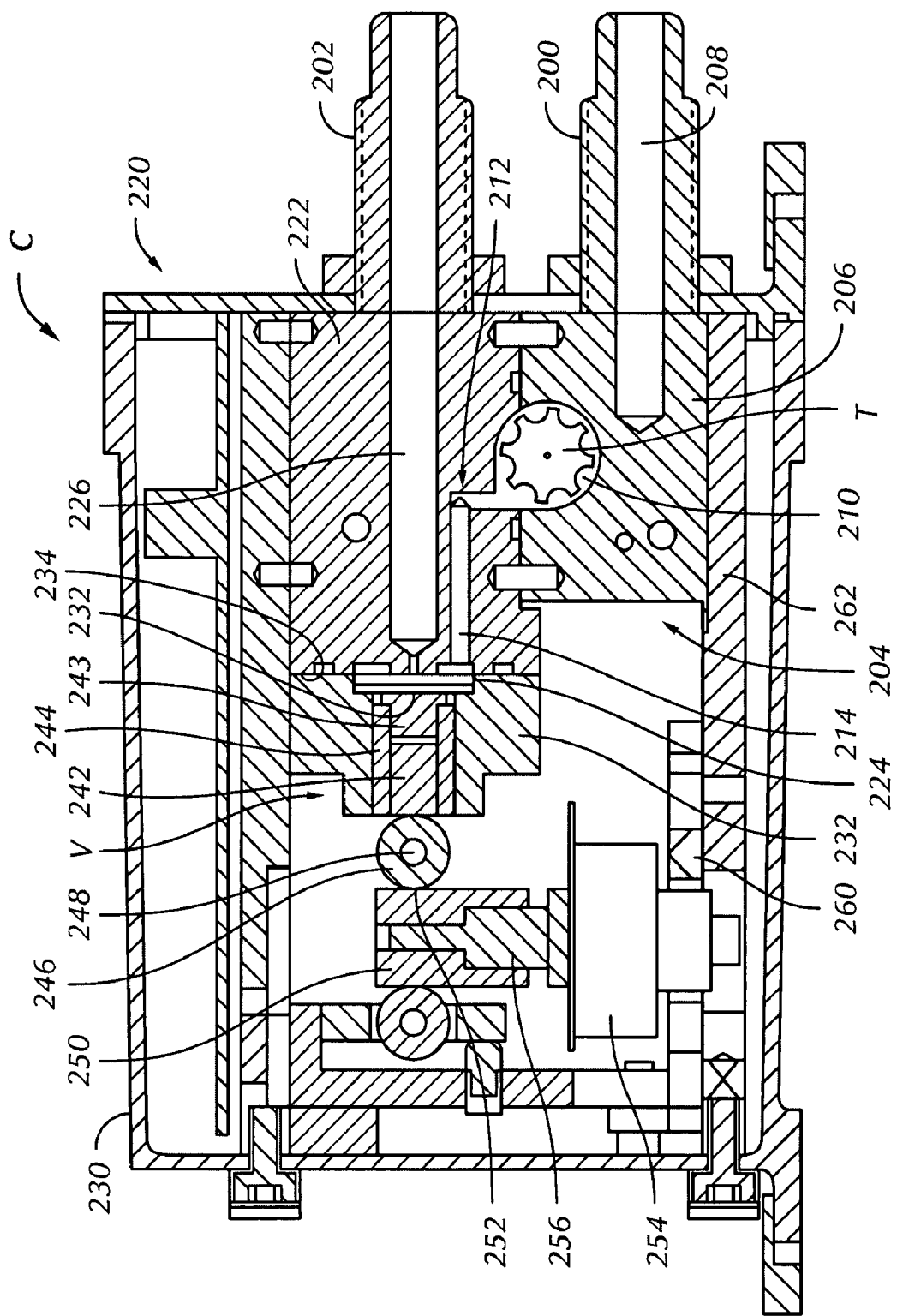
FIG. 22 is a side elevation view, taken in cross-section, of portions of the flow controller of FIG. 21.

Referring now to FIGS. 21-23, the letter C designates generally a flow control system for controlling the flow of a fluid to desired flow parameters. The flow controller C according to the present invention provides control of the rate of a fluid flowing at a low flow rate from an inlet fluid conduit 200 in a connector 201 to an outlet fluid conduit 202 in a connector 203. The flow controller C includes a flow meter 204 which is formed in a housing body 206. A flow inlet conduit 208 in the housing body 206 receives fluid at the low flow rate from the inlet fluid conduit 200 and conveys the fluid to a fluid receiving chamber 210 which contains a turbine wheel T. The direction of flow through the controller C may be reversed, if desired. The turbine wheel T is of the type shown in FIGS. 7-9 described above and provides optical counting of the incoming fluid flow rate in the manner described above. The turbine wheel T is mounted for rotational movement within the flow receiving chamber 210.

The turbine wheel T has a plurality of semi-circular openings 52 (FIGS. 7-9) formed therein and extending therethrough at spaced positions about its outer peripheral portion. A flow outlet 212 in the housing body 206 allows the fluid to exit from the housing body 206 and move to a flow control valve V. As will be set forth, the valve V receives fluid in a conduit 214 and is operably connected to the flow meter 204 to adjust the rate of flow from the conduit 214 based on the measured flow rate in the flow meter 204 and desired flow parameters of the fluid.

The flow control system C thus includes the flow control valve V in the form of a proportional valve, a flow measuring device or apparatus in the form of the flow meter 204 to measure the flow of the fluid, and a monitoring mechanism flow control device or computer D (FIG. 21). The flow control system C is suitable for liquids. The liquids may be inert or high purity, or even highly corrosive liquids, or slurries containing any of the foregoing types of liquids.

The flow meter 204 is mounted to a housing body 220 of the flow control valve V through a connector or middle body 222 with dowel pins or other suitable connecting mechanisms. The fluid flow passage 214 formed in the connector body 222 conveys fluid to a flow control chamber 224 of the valve V. An outlet conduit 226 in the connector body 222 conveys fluid from the valve V to the fluid conduit 202.

The flow rate measurements from the flow meter 204 are provided as information signals to the flow control device or computer D (FIG. 21) and there compared with a specified or established flow parameter. Variations in the flow parameters indicated as a result of comparisons in the computer D are sensed and used to form correction signals which are furnished by the computer D to adjust the flow through the valve V and achieve the specified or established flow parameters in the flow controller C. The computer D can be a suitably programmed or programmable microprocessor or microcontroller of any conventional type of suitable processing capacity commercially available from numerous sources. It should be understood that other digital processors may be used as well, such as a laptop computer, or any other suitable processing apparatus.

The housing body 220 of valve V is mounted with a top support plate 230 by a suitable number of connectors. A bearing block 232 is mounted by to a rear wall or surface 234 of the housing body 220 beneath the top support plate 230. The flow control chamber 224 of the valve V contains an adjustable diaphragm 240 in an inner central portion of the space between the bearing block 232 and the housing body 220. The adjustable diaphragm member 240 is mounted as one wall of the flow control chamber 224. Flow control chamber 224 and adjustable diaphragm 240 are engaged around outer surface portions and sealed by suitable seals suitably mounted in a rear surface of the housing body 220.

The adjustable diaphragm member 240 of the proportional valve V is formed from a sheet of corrosion resistant synthetic resin, preferably PTFE, and is generally rectangular in form and of suitable thickness based on fluid flow conditions, valve responsiveness and accuracy, and other considerations. Further details of an example adjustable diaphragm are contained, for example, in U.S. Pat. No. 7,051,757, which is incorporated herein by reference.

The adjustable diaphragm member 240 is flexible, and a central hub area is movable inwardly and outwardly with respect to the flow control chamber 224 in response to an actuator rod or plunger 242 and force transfer member 243 to selectively vary the flow through the proportional valve V according to the expected fluid flow rate and control condition. Adequate movement is provided so that an innermost portion of the central hub area at its innermost position seals the flow control chamber 224 and the flow passage 214 to seal and block flow of fluid through the proportional valve V.

The actuator rod 242 and force transfer member 243 act upon a rear surface of the adjustable diaphragm member 240 at a central or hub portion to cause relative movement of the adjustable diaphragm member 240. The actuator rod 242 is received within a bushing member 244 for relative inward and outward movement. The bushing member 244 is mounted within the bearing block 232 and moves reciprocally to vary the relative position of the adjustable diaphragm member 240 and vary the volume of the flow control chamber 224.

The actuator rod 242 is engaged at an opposite end from the adjustable diaphragm member 240 by a rotatable cylindrical bearing 246. The cylindrical bearing 246 is rotatably mounted on a bearing roller shaft 248 within the proportional valve V, and the cylindrical bearing 246 and roller shaft 248 are adapted for relative movement within the proportional valve V in response to a cam member 250.

The cam member 250 is preferably a vertically reciprocating cam which has a tapered contact surface 252. The cam member 250 is adapted to move upwardly and downwardly in response to a motor 254 which incrementally moves an extendable shaft 256 in response to control signals from the computer D or other input control signals from an operator or other input source. A suitable motor 254 is of the commercially available type known as a linear stepper motor.

The cam member 250 has a contact surface which is programmed in slope and length or other configuration design based upon the particular flow control application, and requirements for the proportional valve V. The contact surface 252 of the cam member 250 thus has a shape and dimension conformed to calculations defining the requisite movement of the actuator rod 242 and the adjustable diaphragm member 240.

The cam member 250 is mounted with shaft 256 of the motor 254. The shaft 256 is incrementally advanced or withdrawn upwardly or downwardly under control of the motor 254. The motor 254 is mounted with a motor support plate 260 which is in turn mounted to a lower plate or base member 262 of the flow controller C.

It can thus be seen that the actuator rod or shaft 242 of the proportional valve V is moved by the customized profile or contact surface 252 of the cam member 250. The actuator rod 250 presses against the adjustable diaphragm member 240 to regulate flow through flow control chamber 224 and achieve the specified or established flow parameters in the flow controller C.

The relative size and position of the inlet passage 208 and outlet passage 212 in housing body 206 are also customizable to match specific flow parameters. As the actuator rod 242 is pressed against the diaphragm 240, the flow through chamber 224 is incrementally and gradually adjusted. Movement of the actuator rod 242 to an innermost end of stroke causes fluid passage through chamber 224 to be closed to stop flow of the fluid through the valve V.

As the actuator rod 242 is moved away from the diaphragm 240, the flow gradually increases, up to a maximum flow rate which is obtained through the valve V with the diaphragm 240 fully retracted. During the movement of the actuator rod 242, the flow rate through flow control chamber 224 is changing according to pre-programmed features in the profiled cam surface of cam member 250 based on the specific flow parameters for the exact fluid, pressures, temperature, viscosity and other flow control parameters.

The valve V thus has programmable flow characteristics, allowing it to produce more accurate flow control over widely varying conditions or fluid flow parameters, and is suitable for proportional flow control of most fluids, including highly corrosive liquids. Flow rates can be controlled with a great degree of resolution from a 4-5 mL/min up to approximately 100 mL/min with a relatively small size valve.

Flow characteristics can be programmed easily and inexpensively into the valve in a manufacturing/production environment, providing a low-cost solution. The flow controller C can be used with polishing slurries, with its adjustment for wear during extended use, as well. This is advantageous, since certain industrial processes such as semiconductor processes often use these slurries which contain abrasive materials. As noted above, other uses for the flow system C include: gas or vapor flow control, steam flow control, or for flow control of mixtures of gas and liquid.

Inclusion of turbine wheel T in fluid controller systems as those disclosed herein provide surprisingly unexpected improvement is controlling fluid flow at rates as low as 4-5 mL/min. For example, with the wheel T better linearity, repeatability, and better flow dynamic range are provided when compared to previous fluid flow controller systems. Moreover, turbine wheel T can better reject small air bubbles, which in prior wheel turbines would interfere with the rotation of the turbine wheels at low flow rates and, thus, render prior turbine wheels less accurate at low flow rates, e.g., flow rates less than 10 mL/min.

It should also be understood that the turbine wheel T of the present invention may be included as part of other numerous flow measuring or control systems such as those disclosed in U.S. Pat. Nos. 5,542,302; 5,728,949; and 7,051,757, each of which is incorporated herein in its entirety for all purposes.

Figure 15:
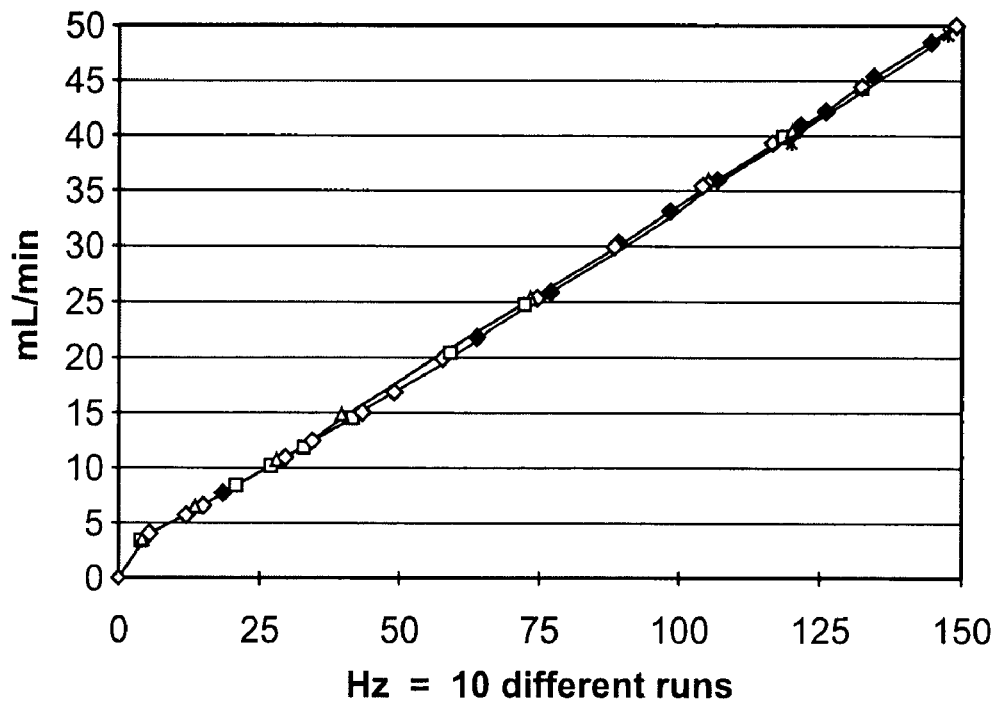
FIG. 15 is a graph illustrating repeatability of flow measurement results with a flow meter according to the present invention.

FIG. 15 is a data plot which illustrates the linearity and repeatability of flow rate measurement and control provided according to the present invention. In FIG. 15 measurements of flow rate in milliliters perm minute (mL/min) as a function of optical pulse frequency in Hertz (Hz) are shown for a number of test runs with de-ionized water as a test fluid. Various data runs are indicated by different symbols for certain of the data runs, such as a diamond, triangle, square, and shaded square. Results from a total of ten test runs are illustrated by the plotted functions depicted in FIG. 15.

Figure 16:
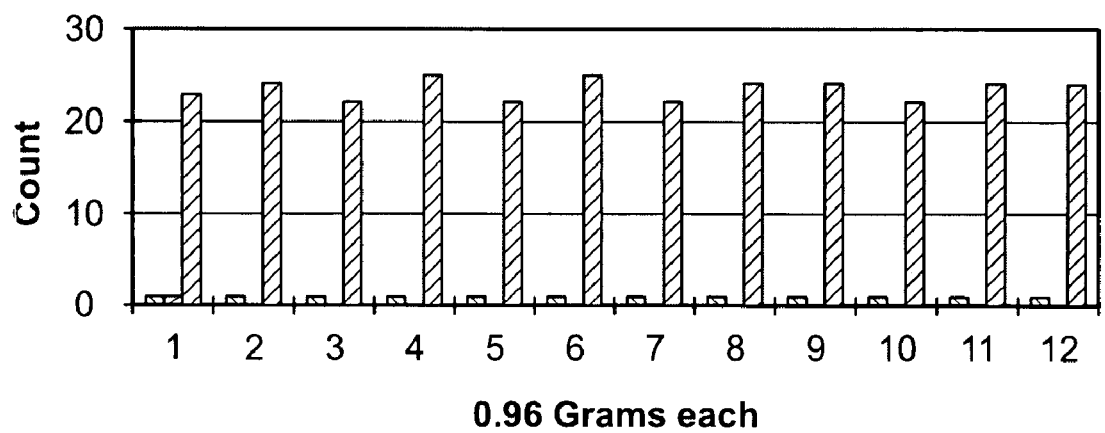
FIG. 16 is a bar graph showing dispensing of low flow rates of a viscous fluid with a flow meter according to the present invention.

FIG. 16 illustrates repeatable output results obtained according to the present invention. Illustrated is a plot of optical pulses counted in a fluid for a set slow rate for a fixed, short time interval. The fluid is a high viscosity fluid, 70 centistokes flowing for a time interval of one second. Pulses were counted for twelve separate tests in such a fluid for this time interval. As can be seen, the number of pulses counted during the sample time proved acceptably accurate and consistent in the tests. It is also to be noted that a very small amount, 0.96 grams, of fluid is being dispensed.

Figure 17:
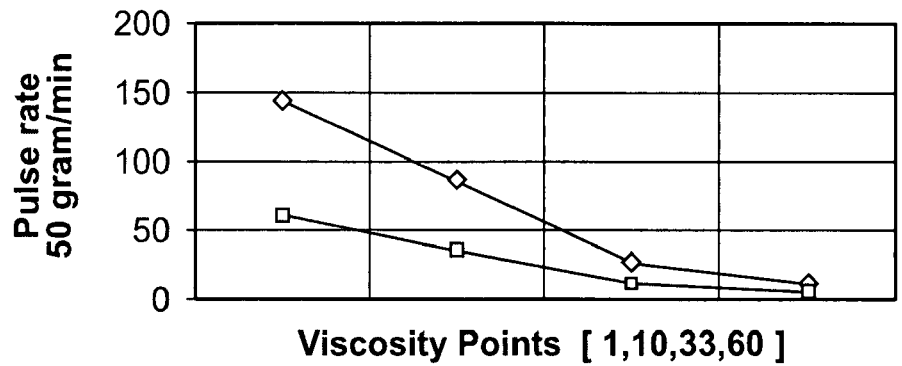
FIG. 17 is a graph comparing responses for liquids of differing viscosities with a flow meter according to the present invention.

FIG. 17 is a plot of data results obtained with the present invention as a function of fluid viscosity. Shown in FIG. 17 are pulse rates at a fluid flow rate of 50 grams per minute for fluid viscosities of 1, 10, 33, and 60 centistokes. The data plot of FIG. 17 illustrates the sensitivity at low flow rates, even for viscous, low flow liquids obtained in accordance with the present invention.

Figure 18:
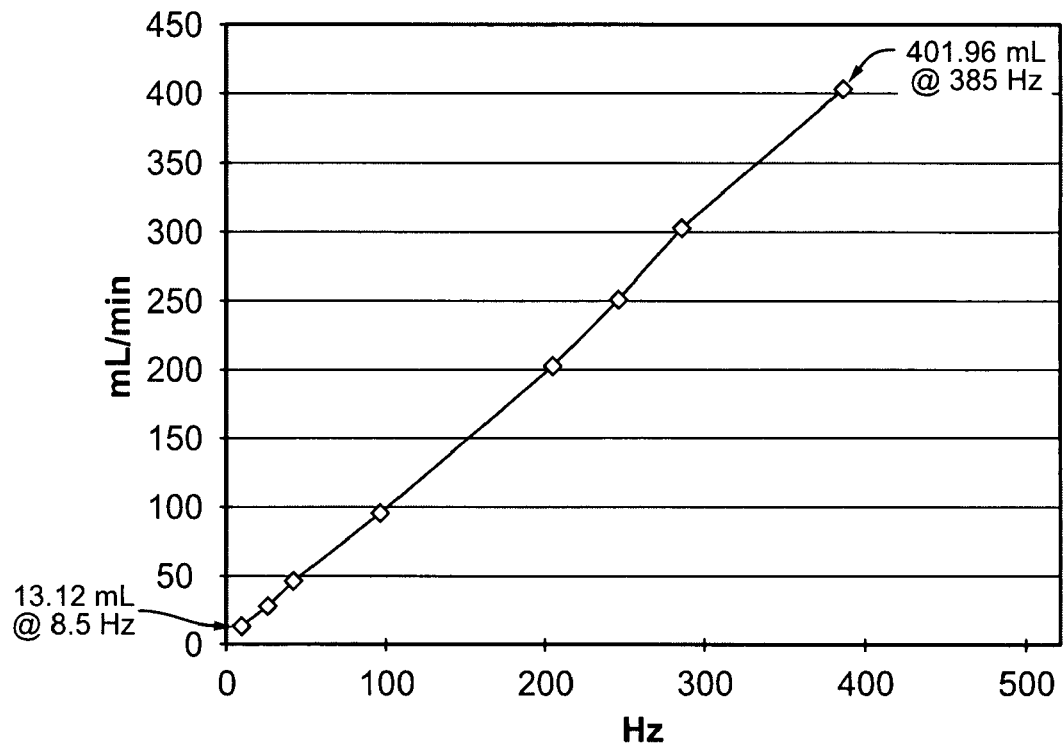
FIG. 18 is a data plot illustrating results with a flow meter according to the present invention over a range of low fluid flow rates.

With respect to FIG. 18, a plot of test results of flow rate of fluid as a function of optical pulse count is shown. FIG. 18 illustrates the ability according to the present invention to accurately sense flow rates on a range from a relatively low flow rate of about 10 mL/min (13.12 mL/min) to above 400 mL/min. FIG. 18 also illustrates the ability to achieve measurements in a linear manner over this range of flow rates of the fluid.

Figure 19:
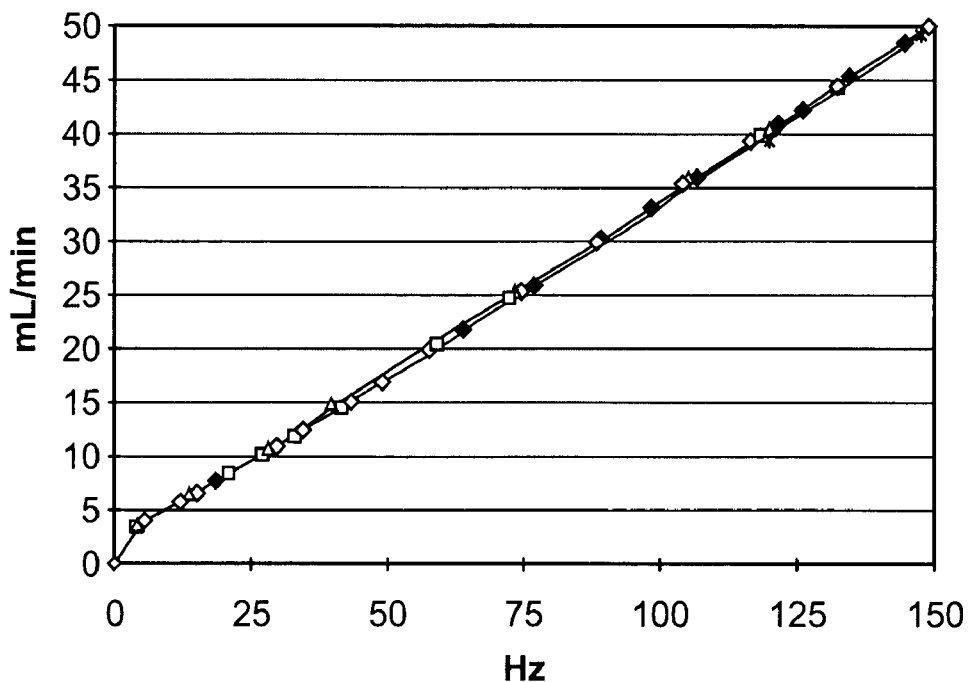
FIG. 19 is a graph illustrating repeatability of flow measurement results with a flow meter according to the present invention.

FIG. 19 is another a data plot which illustrates the linearity and repeatability of flow rate measurement and control provided according to the present invention. In FIG. 19 measurements of flow rate in milliliters perm minute (mL/min) as a function of optical pulse frequency in Hertz (Hz) are again shown. The data readings for a number of various data runs are indicated by different symbols for certain of the data runs, such as a diamond, triangle, square, and shaded square. Results plotted in FIG. 15 indicate linearity of flow rate readings as a function of optical pulse frequency over a range of flow rates from a very low flow rate of between about 3 and 4 mL/min to a flow rate in the range of 50 mL/min.

Figure 20:
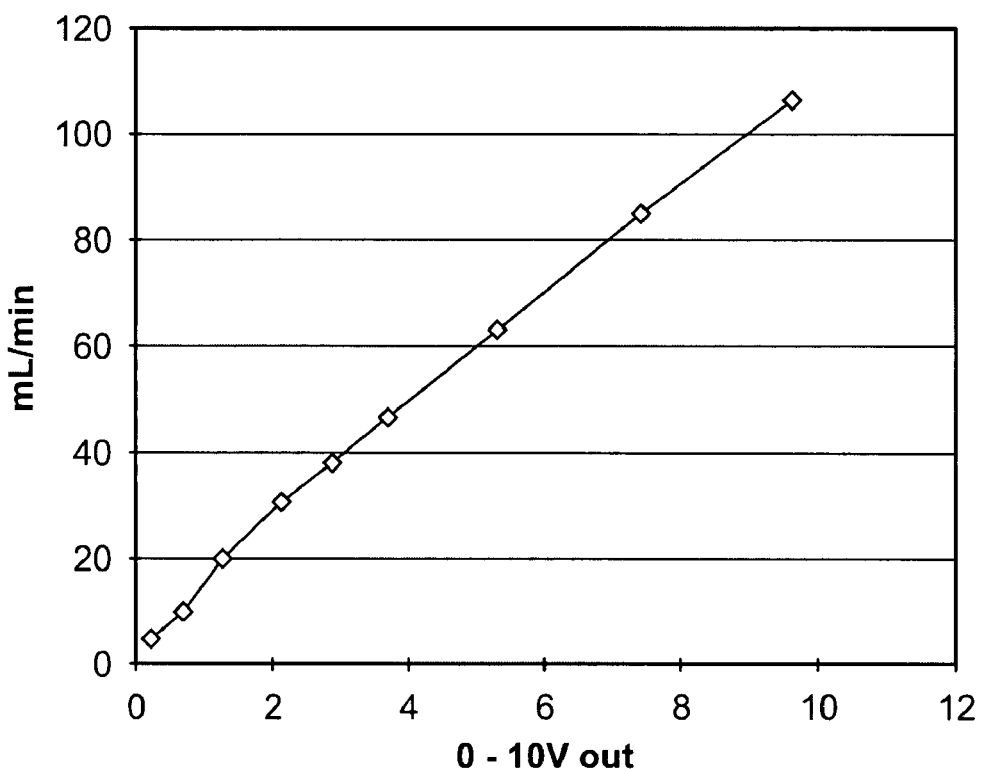
FIG. 20 is a data plot illustrating linearity of output readings over a range of flow rates according to the present invention.

FIG. 20 also illustrates linearity of flow rate readings with the present invention as a function of output voltage from conventional electronic instrumentation, which corresponds to optical pulse frequency. Results plotted in FIG. 20 indicate linearity of flow rate readings as a function of output voltage over a range of flow rates from a very low flow rate of between about 3 and 4 mL/min to a flow rate of over one hundred mL/min.

Thus, the present invention permits measurement and control of fluid flow rates as low as 4-5 mL/min and as high as 100 mL/min in the same meter. Thus, a very high turn-down as useful range for measurement and control is provided.

The present invention solves several problems present when measuring very low flow rates. Because optical detection or counting of rotation is used, the present invention does not require insertion of magnets or metal objects in the rotating wheel of the flow meter or sensor. Thus, the turbine wheel T has significantly lower size and mass.

Bubbles in a liquid can impede low flow rotation, and consequently degrade the low flow measurement capabilities of flow responsive wheels. Bubbles when present cause significant surface tension forces as the rotating wheel moves from a gas to a liquid region in the fluid. The surface tension tends to require additional rotational forces to overcome this drag effect. The turbine wheel T provides for easier removal of bubbles which might attach themselves to the wheel. As the wheel rotates it moves any bubbles to the outer edge of the wheel where they are dislodged or broken by the agitation and motion. Smaller bubbles can flow out to the exit outlet. The blades and circular lateral openings in the turbine wheel T have been found with the present invention to permit optical detection of rotation as well as exhibit surfaces where bubbles do not readily remain.

Liquid viscous adhesion effects and surface tension friction drag effects are also considerations when measuring low flow. The turbine wheel T of the present invention also reduces the overall size or diameter from those known and available. As has been set forth the wheel diameter is reduced from about 0.9 inches to about 0.5 inches in one example. With the reduced size, mass is reduced some 75%. More importantly, the outer portions of the wheel which are furthest from the axis of rotation are reduced in mass due to the presence of the lateral openings 52 at these radially distant areas of the wheel.

The surface area of the outer one-fourth of the wheel 50 with a diameter of 0.5 inches, due to the presence of the lateral openings 52 is from about 0.05 in$^2$ to about 0.06 in$^2$. This is to be contrasted to a surface area of about 0.376 in$^2$ of a wheel with a diameter of 0.9 inches, a resultant surface area reduction of about 670%. This reduction is due to the smaller size of the turbine wheel of the present invention and the openings formed in the outer circumference portions in it. Since the outer rotating region produces more surface tension forces because of the longer moment arm. Further the circular or semi-circular lateral openings 52 and the curved adjacent blade surfaces of the wheel 50 with thin arcuate edges seem to in effect cut the tension more easily.

The force of the fluid entering the receiving chamber R is captured more efficiently with the circular or semi-circular lateral openings 52 and the curved adjacent blade surfaces of the wheel 50. These regions provide rotation even where very low liquid flow rates are present.

The foregoing disclosure and description of the invention are illustrative and explanatory thereof, and various changes in the size, shape and materials, and components, as well as in the details of the illustrated construction may be made without departing from the spirit of the invention.

What is claimed is:

1. A flow meter for a fluid flowing at a low flow rate, comprising:
    a housing body;
    a flow inlet in the housing body receiving incoming fluid at the low flow rate;
    a flow outlet in the housing body allowing the fluid to exit from the housing body;
    a flow receiving chamber located in the housing body between the flow inlet and the flow outlet and receiving the low flow rate fluid;
    a turbine wheel mounted for rotational movement within the flow receiving chamber, the turbine wheel having a plurality of semi-circular openings formed therein at spaced positions about an outer peripheral portion, the openings extending laterally through the turbine wheel;
    the openings being successively positioned adjacent the flow inlet as the turbine wheel rotates and defining a volumetric space receiving a quantity of the incoming low flow rate fluid from the flow inlet; and
    a monitoring mechanism for monitoring the rotation of the turbine wheel in response to the passage of the low flow rate fluid through the receiving chamber.

2. The flow controller of claim 1, wherein the plurality of semi-circular openings formed in the turbine wheel are located at equally spaced radial positions about the outer peripheral portion of the turbine wheel, the walls of the semi-circular openings in the turbine wheel forming blades moving in response to the energy of the fluid entering the flow chamber at the flow inlet.

3. The flow controller of claim 2, wherein the diameter of the turbine wheel is from about 0.4 inches to about 0.6 inches and the plurality of semi-circular grooves have a diameter of about one-fourth the diameter of the turbine wheel.

4. The flow controller of claim 3, wherein the turbine wheel is formed substantially of 10 percent graphite filled polytetrafluorethylene.

5. The flow controller of claim 4, wherein the turbine wheel further includes an axis on which the turbine wheel rotates, the axis having an axis width of about 0.09 inches to about 0.11 inches and the turbine wheel having a width less than the axis width.

6. The flow controller of claim 1, wherein the openings in the turbine wheel form an arc extending inwardly from an outer circumferential surface of the turbine wheel.

7. The flow controller of claim 6, wherein the openings form a semi-circular arc.

8. The flow controller of claim 6, wherein the openings form an arc of from about 150° to about 210°.

9. The flow controller of claim 6, wherein the openings form an arc of about 180°.

10. A turbine wheel mounted for rotational movement within a flow receiving chamber, the turbine wheel having a plurality of semi-circular openings formed therein at spaced positions about an outer peripheral portion, the openings extending laterally through the turbine wheel; the openings being successively positioned adjacent the flow inlet as the turbine wheel rotates and defining a volumetric space receiving a quantity of an incoming low flow rate fluid from the flow inlet.

11. The turbine wheel of claim 10, wherein the openings in the turbine wheel form an arc extending inwardly from an outer circumferential surface of the turbine wheel.

12. The turbine wheel of claim 11, wherein the openings form a semi-circular arc.

13. The turbine wheel of claim 11, wherein the openings form on arc of from about 150° to about 210°.

14. The turbine wheel of claim 11, wherein the openings form on arc of about 180°.

15. The turbine wheel of claim 10, wherein the plurality of semi-circular openings formed in the turbine wheel are located at equally spaced radial positions about the outer peripheral portion of the turbine wheel, the walls of the semi-circular openings in the turbine wheel forming blades moving in response to the energy of the fluid entering the flow chamber at the flow inlet.

16. The improved system of claim 15, wherein the diameter of the turbine wheel is from about 0.4 inches to about 0.6 inches and the plurality of semi-circular grooves have a diameter of about one-fourth the diameter of the turbine wheel.

17. The improved system of claim 16, wherein the turbine wheel is formed substantially of 10 percent graphite filled polytetrafluorethylene.

18. A flow controller for controlling the rate of a fluid flowing at a low flow rate through a fluid conduit, comprising:
   a flow meter, comprising:
      a housing body;
      a flow inlet in the housing body receiving incoming fluid at the low flow rate;
      a flow outlet in the housing body allowing the fluid to exit from the housing body;
      a flow receiving chamber located in the housing body between the flow inlet and the flow outlet and receiving the low flow rate fluid;
      a turbine wheel mounted for rotational movement within the flow receiving chamber, the turbine wheel having a plurality of semi-circular openings formed therein at spaced positions about an outer peripheral portion, the openings extending laterally through the turbine wheel;
      the openings being successively positioned adjacent the flow inlet as the turbine wheel rotates and defining a volumetric space receiving a quantity of the incoming low flow rate fluid from the flow inlet; and
      a monitoring mechanism for monitoring the rotation of the turbine wheel in response to the passage of the low flow rate fluid through the receiving chamber; and
   a valve located in the conduit and operably connected to the flow meter to adjust the rate of flow through the conduit based on the measured flow rate.

19. The flow controller of claim 18, wherein the openings in the turbine wheel form an arc extending inwardly from an outer circumferential surface of the turbine wheel.

20. The flow controller of claim 18, wherein the openings form a semi-circular arc.

21. The flow controller of claim 18, wherein the openings form on arc of from about 150° to about 210°.

22. The flow controller of claim 18, wherein the openings form on arc of about 180°.

* * * * *